US012328349B2

(12) United States Patent
Ohida et al.

(10) Patent No.: US 12,328,349 B2
(45) Date of Patent: Jun. 10, 2025

(54) METHOD FOR DISPLAYING OBJECT IN TIMELINE AREA, OBJECT DISPLAY DEVICE, AND INFORMATION RECORDING MEDIUM HAVING RECORDED THEREON PROGRAM FOR IMPLEMENTING SAID METHOD

(71) Applicant: GREE, INC., Tokyo (JP)

(72) Inventors: Takashi Ohida, Minato-ku (JP); Taro Yoshioka, Minato-ku (JP); Masaya Higashino, Minato-ku (JP); Kenji Sugimoto, Minato-ku (JP); Maya Sawamura, Minato-ku (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 17/939,798

(22) Filed: Sep. 7, 2022

(65) Prior Publication Data
US 2023/0007061 A1    Jan. 5, 2023

Related U.S. Application Data

(63) Continuation of application No. 17/352,060, filed on Jun. 18, 2021, now Pat. No. 11,470,133, which is a
(Continued)

(30) Foreign Application Priority Data
Sep. 21, 2012  (JP) ................................. 2012-208758

(51) Int. Cl.
*G06F 3/048*     (2013.01)
*G06F 3/0482*    (2013.01)
(Continued)

(52) U.S. Cl.
CPC .......... *H04L 65/403* (2013.01); *G06F 3/0482* (2013.01); *G06F 3/04842* (2013.01); *H04L 51/52* (2022.05); *G06Q 50/01* (2013.01)

(58) Field of Classification Search
None
See application file for complete search history.

(56) References Cited

U.S. PATENT DOCUMENTS 7,343,559 B1 * 3/2008 Fujita ...................... G06F 16/51
707/E17.031
8,307,086 B2 * 11/2012 Whitnah ................. H04L 67/53
709/224
(Continued)

FOREIGN PATENT DOCUMENTS

JP          H113372 A     1/1999
JP       2001211270 A     8/2001
(Continued)

OTHER PUBLICATIONS

Sato, Y., "Twitter, Koshiki Mobile Appli deno Kokoku Tweet Hyoji o Kaishi e", Itmedia News, URL: http://www.itmedia.co.jp/news/articles/1202/29/news045.html, (Feb. 29, 2012), Total 5 Pages, with English translation.
(Continued)

*Primary Examiner* — Hua Lu
(74) *Attorney, Agent, or Firm* — Oliff PLC

(57) ABSTRACT

A method for displaying objects on a timeline area does not lower user retention and can increase the CVR. The present disclosure provides a method for displaying objects on a timeline area, including the steps of an object display device that manages a timeline of communication messages for a user of a Web service determining whether the user has taken an action within a predetermined time period on the timeline area of the Web service, displaying a first object on the timeline area when determining that the user has not taken
(Continued)

the action, and displaying a second object that differs from the first object on the timeline area when determining that the user has taken the action.

13 Claims, 10 Drawing Sheets

Related U.S. Application Data continuation of application No. 14/429,677, filed as application No. PCT/JP2013/075593 on Sep. 20, 2013, now Pat. No. 11,070,597.

(51) Int. Cl.
*G06F 3/04842* (2022.01)
*H04L 51/52* (2022.01)
*H04L 65/403* (2022.01)
*G06Q 50/00* (2012.01)

(56) References Cited

U.S. PATENT DOCUMENTS

| | | | | |
|---|---|---|---|---|
| 8,799,778 B2* | 8/2014 | Flynn, III | ............. | G06Q 50/01 715/702 |
| 8,886,836 B2* | 11/2014 | Luu | ............. | G06F 40/106 709/217 |
| 8,887,035 B2* | 11/2014 | McDonald | ............. | G06F 16/9577 715/204 |
| 9,110,953 B2* | 8/2015 | Steinberg | ............. | H04N 21/45457 |
| 9,220,977 B1* | 12/2015 | McCaffrey | ............. | A63F 13/87 |
| 2002/0000984 A1 | 1/2002 | Asai et al. | | |
| 2002/0184098 A1* | 12/2002 | Giraud | ............. | G06V 40/165 705/14.66 |
| 2003/0110517 A1* | 6/2003 | Lee | ............. | H04N 21/4316 725/38 |
| 2004/0039630 A1* | 2/2004 | Begole | ............. | G06Q 10/105 705/320 |
| 2006/0042483 A1* | 3/2006 | Work | ............. | H04L 67/306 101/91 |
| 2006/0078160 A1* | 4/2006 | Fujita | ............. | G06Q 10/06 707/E17.116 |
| 2006/0125814 A1 | 6/2006 | Asai et al. | | |
| 2006/0242663 A1* | 10/2006 | Gogerty | ............. | G06Q 30/02 715/752 |
| 2006/0277108 A1* | 12/2006 | Altberg | ............. | G06Q 30/02 705/14.69 |
| 2007/0022442 A1* | 1/2007 | Gil | ............. | H04M 1/72445 725/62 |
| 2007/0083408 A1* | 4/2007 | Altberg | ............. | G06Q 30/02 705/14.69 |
| 2008/0005688 A1* | 1/2008 | Najdenovski | ............. | G06F 16/64 715/765 |
| 2008/0046406 A1* | 2/2008 | Seide | ............. | G06F 16/7328 |
| 2008/0248815 A1* | 10/2008 | Busch | ............. | H04L 67/52 455/456.5 |
| 2008/0275785 A1* | 11/2008 | Altberg | ............. | G06Q 30/0264 705/14.54 |
| 2008/0276279 A1* | 11/2008 | Gossweiler | ............. | H04N 21/4668 725/46 |
| 2009/0063991 A1* | 3/2009 | Baron | ............. | H04L 12/1822 715/751 |
| 2009/0084249 A1* | 4/2009 | Kemp | ............. | G06F 16/68 84/609 |
| 2009/0197582 A1* | 8/2009 | Lewis | ............. | H04L 67/55 455/414.2 |
| 2010/0114714 A1* | 5/2010 | Vitek | ............. | G06Q 30/00 705/14.69 |
| 2010/0131365 A1* | 5/2010 | Subramanian | ............. | G06Q 30/02 705/14.55 |
| 2010/0332305 A1* | 12/2010 | Higgins | ............. | G06Q 30/0214 705/14.44 |
| 2011/0061003 A1* | 3/2011 | Miyazawa | ............. | G06Q 30/02 715/746 |
| 2011/0072374 A1* | 3/2011 | Kunz | ............. | G06Q 30/0276 715/764 |
| 2011/0141218 A1* | 6/2011 | Stancato | ............. | H04N 21/4314 348/E7.001 |
| 2011/0145350 A1* | 6/2011 | Batel | ............. | G06F 16/958 709/206 |
| 2011/0258049 A1* | 10/2011 | Ramer | ............. | G06Q 30/0273 705/14.69 |
| 2011/0264491 A1* | 10/2011 | Birnbaum | ............. | G06F 9/451 715/702 |
| 2012/0011477 A1* | 1/2012 | Sivadas | ............. | G06F 9/453 706/55 |
| 2012/0030587 A1* | 2/2012 | Ketkar | ............. | H04N 21/47 715/751 |
| 2012/0143701 A1* | 6/2012 | Reis | ............. | G06Q 30/0277 705/14.73 |
| 2012/0154447 A1* | 6/2012 | Kim | ............. | G06F 3/04883 345/173 |
| 2012/0209918 A1* | 8/2012 | Shah | ............. | G06Q 30/0251 709/205 |
| 2012/0284093 A1* | 11/2012 | Evans | ............. | G06Q 30/0251 705/14.1 |
| 2012/0303377 A1* | 11/2012 | York | ............. | G06Q 30/02 705/2 |
| 2012/0323680 A1* | 12/2012 | Zhou | ............. | G06F 16/9577 705/14.69 |
| 2013/0005479 A1* | 1/2013 | McCaffery | ............. | A63F 13/30 463/42 |
| 2013/0006743 A1* | 1/2013 | Moore | ............. | G06Q 30/02 705/14.58 |
| 2013/0018957 A1* | 1/2013 | Parnaby | ............. | G06Q 30/0203 709/204 |
| 2013/0047123 A1* | 2/2013 | May | ............. | G06F 3/04817 715/834 |
| 2013/0097484 A1* | 4/2013 | Nakamura | ............. | G06F 16/9535 715/234 |
| 2013/0145254 A1* | 6/2013 | Masuko | ............. | G06F 40/143 715/234 |
| 2013/0151603 A1* | 6/2013 | Lobb | ............. | A63F 13/795 709/204 |
| 2013/0165234 A1* | 6/2013 | Hall | ............. | A63F 13/30 463/42 |
| 2013/0173712 A1* | 7/2013 | Monjas Llorente | .... | H04L 63/10 709/204 |
| 2013/0179802 A1* | 7/2013 | Martinazzi | ............. | G06Q 30/0269 715/753 |
| 2013/0203500 A1* | 8/2013 | Nagatomo | ............. | A63F 13/87 463/42 |
| 2013/0246521 A1* | 9/2013 | Schacht | ............. | G06Q 50/01 709/204 |
| 2013/0254308 A1* | 9/2013 | Rose | ............. | H04N 21/26258 709/206 |
| 2013/0325971 A1* | 12/2013 | Winer | ............. | G06Q 10/1091 709/206 |
| 2014/0020024 A1* | 1/2014 | Asam | ............. | H04N 21/482 725/41 |
| 2014/0024460 A1 | 1/2014 | Fox et al. | | |
| 2014/0057701 A1* | 2/2014 | Robbins | ............. | G07F 17/3225 463/25 |
| 2014/0249926 A1* | 9/2014 | Wallace | ............. | G06Q 30/0277 705/14.64 |
| 2015/0127565 A1* | 5/2015 | Chevalier | ............. | G06Q 10/00 705/319 |
| 2017/0024765 A1* | 1/2017 | Barenholz | ............. | G06Q 30/0255 |

FOREIGN PATENT DOCUMENTS

| | | |
|---|---|---|
| JP | 2001312482 A | 11/2001 |
| JP | 200255920 A | 2/2002 |
| JP | 2003203084 A | 7/2003 |
| JP | 2003304290 A | 10/2003 |
| JP | 2004220429 A | 8/2004 |
| JP | 2004234492 A | 8/2004 |
| JP | 200749424 A | 2/2007 |

(56) References Cited

FOREIGN PATENT DOCUMENTS

| JP | 2008305390 A | 12/2008 |
|---|---|---|
| JP | 2011-175551 A | 9/2011 |
| JP | 201273986 A | 4/2012 |
| WO | 2011/148885 A1 | 12/2011 |

OTHER PUBLICATIONS

"Social Ads", URL: http://www.sophia-it.com/content/%E3%82%BD%E3%83%BC%E3%82%B7%E3%83%A3%E3%83%AB%E5%BA%83%E5%91%8A, Weblio, Inc., (2012), Total 4 Pages, with English translation.
"Web banner", URL: http://ja.wikipedia.org/wiki/%E3%83%90%E3%83%8A%E3%83%BC, Wikipedia, (Mar. 16, 2015), Total 9 Pages, with English translation.
International Search Report Issued Dec. 17, 2013 in PCT/JP13/075593 Filed Sep. 20, 2013.
Japanese Office Action Issued Dec. 16, 2014 for the corresponding Japanese Application No. JP 2014-531009 (with English translation).
Office Action issued Apr. 28, 2015 in Japanese Patent Application No. 2014-531009 (with English language translation).
Office Action issued Nov. 22, 2016 in Japanese Patent Application No. 2015-130194 (with English translation).
Japanese Office Action issued Feb. 28, 2017 in Patent Application No. 2015-130194 (with English Translation).
Office Action mailed Sep. 12, 2017, in Japanese Patent Application No. 2017-102763 (with English-language translation).
Sasaki, Mikio, "Book for Correctly Knowing What you Want to Know about Facebook," Enlarged Revised Edition, First Edition, GaiaX Co. Ltd., GaiaX Social media lab, Jul. 2, 2014, pp. 44-46, 54, 55, 338-339.
FC2 blog, Wikipedia, Wikipedia, Jul. 27, 2012.
Emoto, Tsuyoshi, "You Can Do Video Sharing, Twitter Cooperation, and Remote Control for Free !! ," Secret Techniques of Windows Live, Weekly ASCII, vol. 21, 753rd issue, ASCII Media Works, Inc., Sep. 15, 2009, p. 72.
Office Action issued Jan. 30, 2018 in Japanese Patent Application No. 2017-102763 (with English translation).
Office Action issued Mar. 27, 2018 in Japanese Patent Application No. 2017-7480 with English translation, 16 pages.
Office Action issued Jun. 19, 2018 in Japanese Patent Application No. 2015-130194 (with English language translation), 13 pages.
Office Action issued Jun. 19, 2018 in Japanese Patent Application No. 2017-102763 (with unedited computer generated English translation), 2 pages.
Office Action issued Nov. 5, 2018 in Japanese Patent Application No. 2017-102763 (with unedited computer generated English translation), 3 pages.
Office Action mailed Jun. 4, 2019, in Japanese Patent Application No. 2018-173458 (with English-language translation).
Sugimoto, Akihiko, "Survey of 500 Experts and General Users, What will emerge in Facebook, Twitter and Mixi one year later," Nikkei Digital Marketing, No. 49. p. 32-37. Oct. 24, 2011, Nikkei Business Publications, Inc. (with English language translation).
"How to remove FC2 blog ads that have not been updated for one month," omoidase.com, Extra-brain Memory Information Site for remembering what is that, Aug. 2012, http:/omoidasecorn.blogspot.com/2012/08/blog-post_24.html. searched on May 24, 2019 (with English-language translation).
Katayanagi, Hideo, "Facebook Perfect Manual revised first edition," Obscure Inc., Sosim Co., Ltd., Apr. 13, 2012, p. 22-23, 156-170, 260-269 (with English-language translation).
Japanese Office Action issued Dec. 3, 2019 in Japanese Patent Application No. 2017-102763 (with unedited computer generated English translation), 25 pages.
Mikio, S., "Book for Correctly Knowing What you Want to Know about Facebook," Enlarged Revised Edition, First Edition, Gaiax Co. ltd., Gaiax Social media lab, Jul. 2, 2012, pp. 44, 46, 54-55, 164, 205, 339.
Office Action issued on Feb. 4, 2020 in Japanese Patent Application No. 2018-173458 (with unedited computer generated English translation), 10 pages.
Office Action issued May 19, 2020 in corresponding Japanese Patent Application No. 2018-173458 with English Translation.
Reconsideration Report by Examiner before Appeal issued Jul. 31, 2017 in Japanese Patent Application No. 2015-130194 with concise English translation.
Kent Joshi, "Using Facebook", Jun. 16, 2011, Que, Chapter 2.

* cited by examiner

FIG. 12
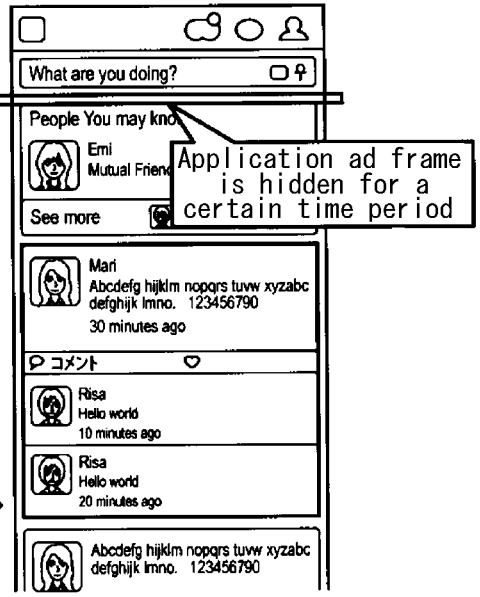
FIG. 13

FIG. 14
While ad is being displayed
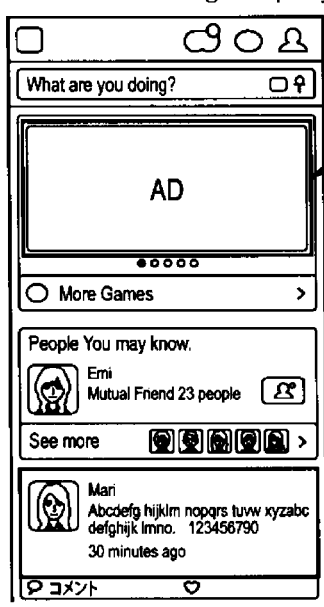
Display after an action (writing of a comment)
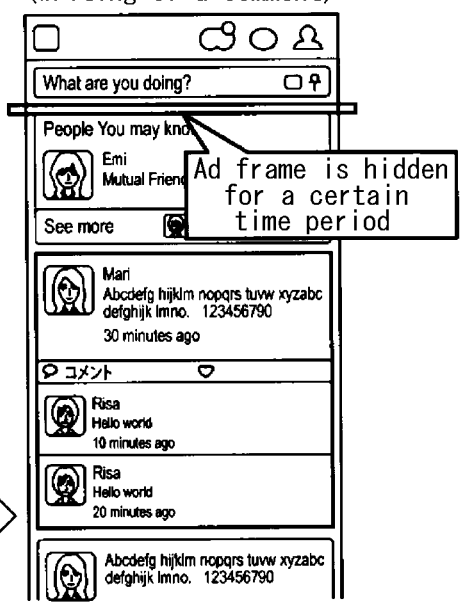
Display optimal ad based on user attributes
Send user to campaign page
Return
Entered into communication mode
Writing of a comment, brief remark, or other such posting
Ad frame is hidden for a certain time period

METHOD FOR DISPLAYING OBJECT IN TIMELINE AREA, OBJECT DISPLAY DEVICE, AND INFORMATION RECORDING MEDIUM HAVING RECORDED THEREON PROGRAM FOR IMPLEMENTING SAID METHOD

CROSS REFERENCE TO RELATED APPLICATION

This application is a continuation of U.S. Ser. No. 17/352,060, filed Jun. 18, 2021, which is a continuation of U.S. Ser. No. 14/429,677, filed Mar. 19, 2015, which is a U.S. National Stage of PCT/JP13/075593, filed Sep. 20, 2013, and claims the benefit of priority under 35 U.S.C. § 119 of Japanese Application No. 2012-208758, filed Sep. 21, 2012, the entire contents of each of which are incorporated herein by reference.

FIELD

Embodiments of the present disclosure relate to a method for displaying objects in a timeline area, an object display device, and an information recording medium having recorded thereon a program for implementing the method.

BACKGROUND

Social Network Services (SNS), representative examples of which include Twitter® and Facebook®, provide a timeline function. This timeline function allows for communication messages, such as one's own tweets or those of people who are connected over a Web service such as an SNS, to flow chronologically.

The method of display for the timeline function is for new communication messages to appear in order from the top, with older messages flowing sequentially downwards and then off the screen, disappearing from view.

On the other hand, apart from a user's communication messages, a fixed advertising frame or fixed announcement frame is established for objects such as game announcements, advertisements, and the like.

When a fixed advertising frame and fixed announcement frame are established apart from a user's communication messages, as described above, to display objects such as game announcements, advertisements, and the like, a problem occurs in that user retention is reduced.

In a conventional method for establishing a fixed advertising frame and fixed announcement frame, a problem also exists in that visibility worsens due to the characteristics of the user interface, in particular on a mobile phone such as a smart phone or a feature phone, and the CVR for business ends up being reduced. In this context, CVR is a ratio indicating the fraction, among the number of times a website is accessed (page views) or among unique users, that leads to a conversion (the end result that can be achieved from the website, such as a merchandise purchase or request for a brochure).

Exemplary embodiments of the present disclosure have been conceived in light of these circumstances and provides a method for displaying objects in a timeline area of a Web service, an object display device, and an information recording medium having recorded thereon a program for implementing the method that do not reduce user retention and that can increase the CVR.

SUMMARY

A first aspect of the present disclosure provides a method for displaying an object in a timeline area, comprising the steps of: an object display device that manages a timeline of communication messages for a user of a Web service determining whether the user has taken an action within a predetermined time period on the timeline area of the Web service; and displaying a first object on the timeline area when determining that the user has not taken the action and displaying a second object that differs from the first object on the timeline area when determining that the user has taken the action.

A second aspect of the present disclosure provides a method for displaying an object in a timeline area, comprising the steps of: an object display device that manages a timeline of communication messages for a user of a Web service determining whether a predetermined event has occurred with respect to a communication message on the timeline area of the Web service for an application program having a timeline function; and when determining that the predetermined event has occurred, hiding any object displayed in the timeline area other than the communication messages for a certain time period.

A third aspect of the present disclosure provides a method for transmitting an object, comprising the steps of: a server receiving, from a terminal that manages a timeline of communication messages for a user of a Web service, a query as to whether the user has taken an action within a predetermined time period on the timeline area of the Web service; referring, for the query that has been received, to information on a date and time of an action by the user pertaining to the query and providing a response as to whether the user has taken an action within the predetermined time period; and in accordance with a request from the terminal based on the response, transmitting a first object or a second object to the terminal.

Exemplary embodiments of the present disclosure can provide a method for displaying objects in a timeline area of a Web service, an object display device, and an information recording medium having recorded thereon a program for implementing the method that do not reduce user retention and that can increase the CVR.

BRIEF DESCRIPTION OF THE DRAWINGS

Exemplary embodiments of the present disclosure will be further described below with reference to the accompanying drawings, wherein:

FIG. 12 illustrates screens on the mobile phone 4-1 when an action, such as writing in response to a user's comment in the timeline area, is taken while an application announcement frame is displayed in the timeline area;

FIG. 13 is an example of a screen on the mobile phone 4-1 illustrating how the application announcement frame displayed in the timeline area flows as part of the stream; and FIG. 14 illustrates an example of screens on the mobile phone 4-1 in which an ad is displayed in the timeline area.

DETAILED DESCRIPTION

With reference to the drawings, the following describes a method for displaying objects in a timeline area of a Web service (including SNS services) according to an embodiment of the present disclosure.

Figure 1:
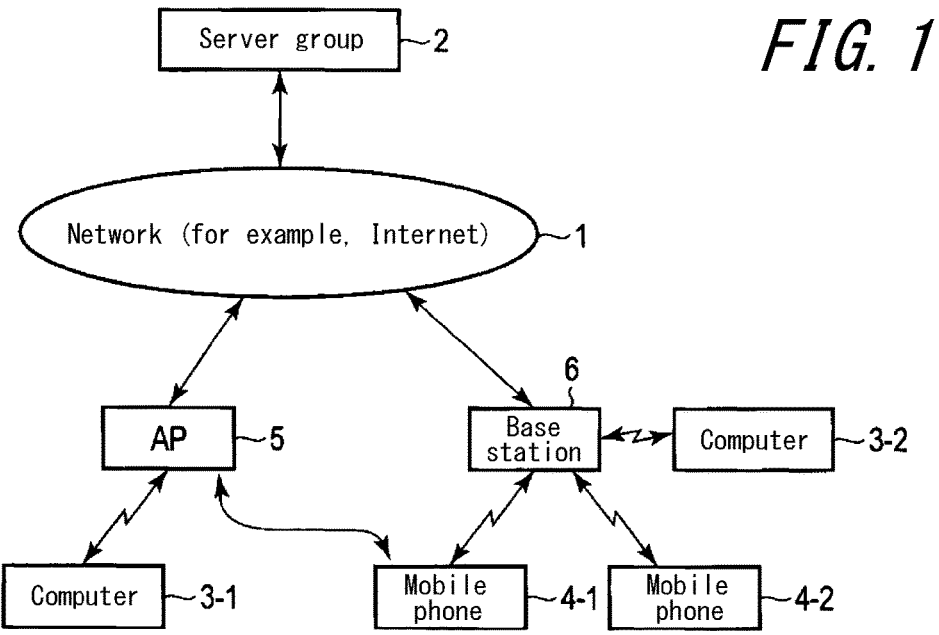
FIG. 1 illustrates the environment in which an information device for displaying objects in a timeline area according to an embodiment of the present disclosure is used.

FIG. 1 illustrates the environment in which an information device for displaying objects in a timeline area according to an embodiment of the present disclosure is used.

As illustrated in FIG. 1, a server group 2 is connected to a network 1, such as the Internet. A plurality of computers 3-1 and 3-2 and mobile phones 4-1 and 4-2, which are information devices for displaying objects according to an embodiment of the present disclosure, are connected to the network 1 (for example, the Internet) via an access point 5 or a base station 6.

The server group 2 may be implemented by one computer or may be configured with a plurality of computers with separate functions, such as a Web server, a processing server, a database server, and the like. In this embodiment of the present disclosure, any configuration may be adopted.

In addition to a typical desktop computer, the computer 3 encompasses a mobile computer, a laptop computer, a tablet terminal, and the like.

The mobile phone 4 encompasses a smart phone, a feature phone, and the like, and for example operates on Android®, iOS®, or another such OS.

Figure 2:
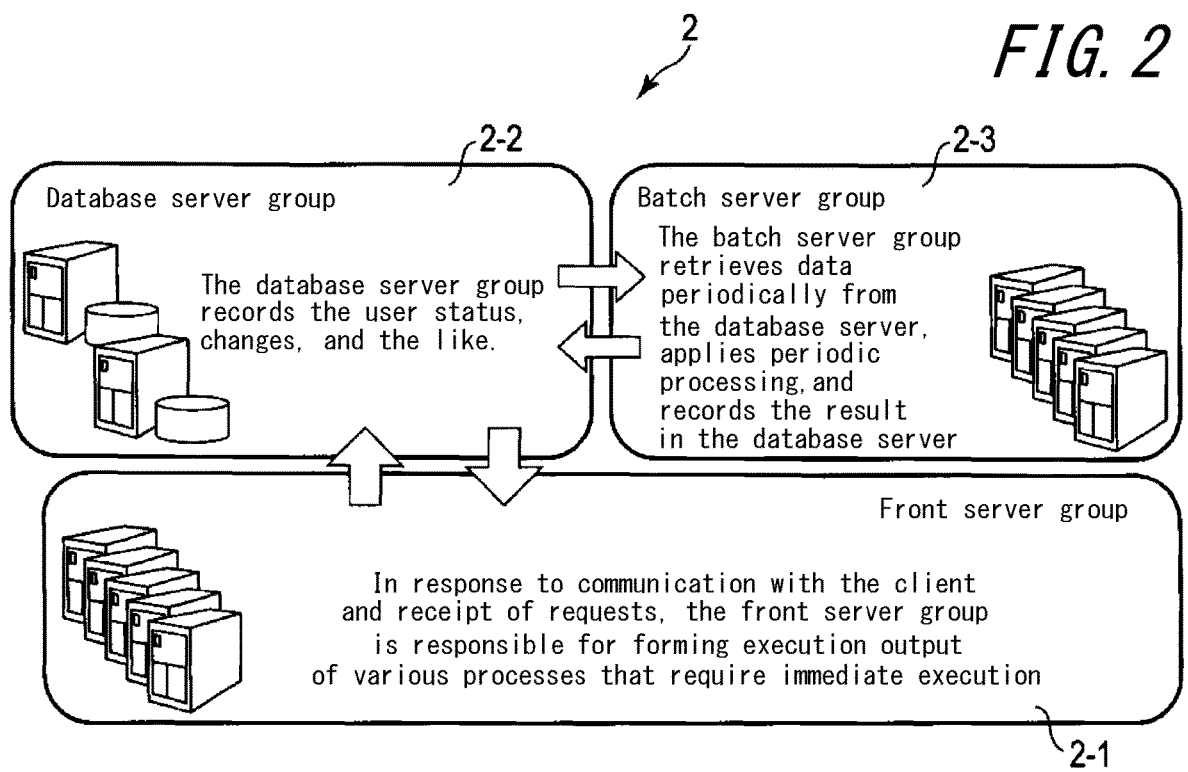
FIG. 2 illustrates an example of the configuration of a server group 2 in an embodiment of the present disclosure.

FIG. 2 illustrates an example of the configuration of the server group 2 in an embodiment of the present disclosure.

As illustrated in FIG. 2, for example the server group 2 includes a front server group 2-1, a database server group 2-2, and a batch server group 2-3.

In response to communication with the client and receipt of requests, the front server group 2-1 is responsible for formation of execution output of various processes that can be executed immediately. For example, the front server group 2-1 is a Web server.

The database server group 2-2 is, for example, a processing server that executes processes forming the nucleus of the social network service processing.

The batch server group 2-3 retrieves data periodically from the database server group 2-2, applies periodic processing, and records the result in the database server group 2-2.

In the present embodiment, in order to simplify the explanation, the case of operation on one server is described, yet as described above, the configuration of the server is of course not limited in this way.

Figure 3:
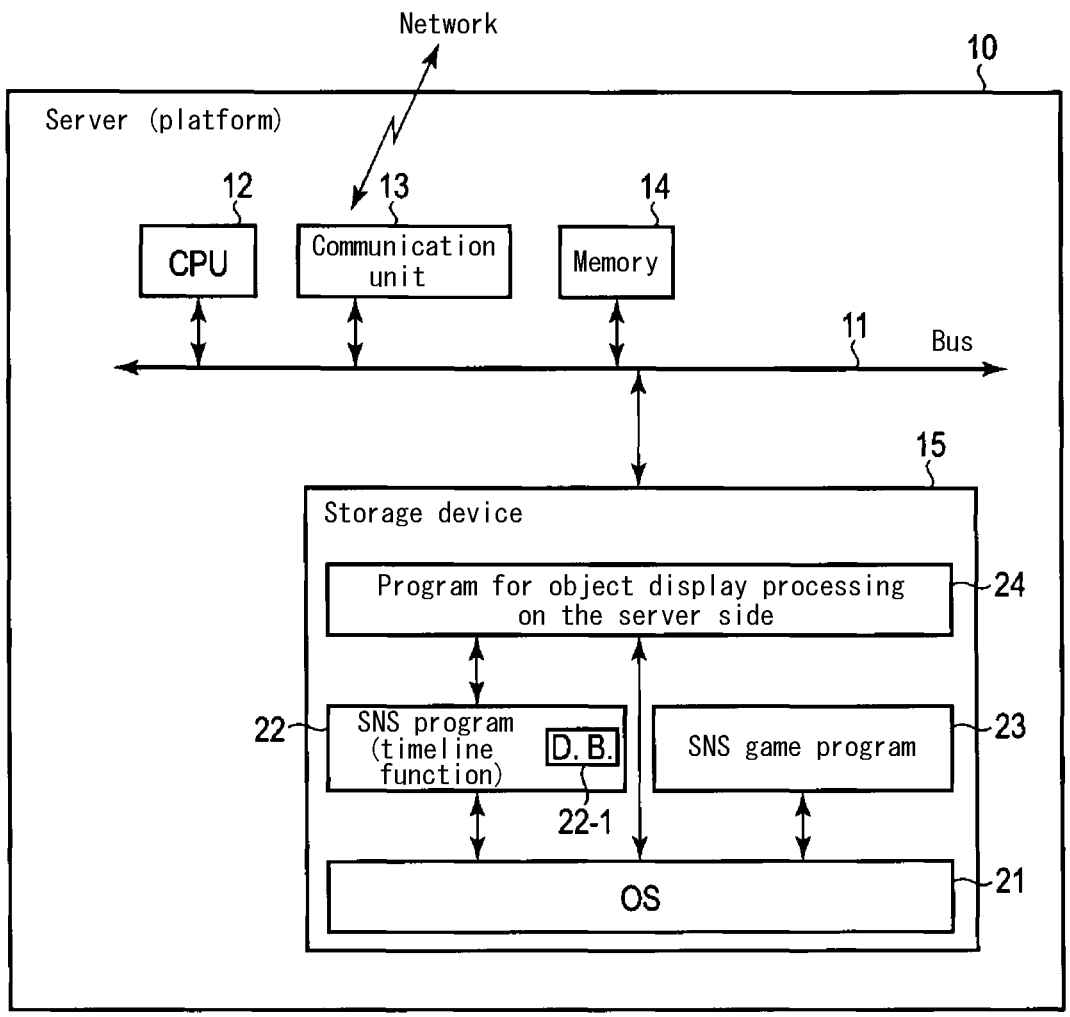
FIG. 3 illustrates the configuration of a server 10 that executes operations to implement the method for displaying objects in a timeline area according to an embodiment of the present disclosure.

FIG. 3 illustrates the configuration of a server 10 that executes operations to implement the method for displaying objects in a timeline area according to an embodiment of the present disclosure.

As illustrated in FIG. 3, in the server 10, a CPU 12, communication unit 13, memory 14, and storage device 15 are connected to a bus 11.

The CPU 12 coordinates with a program 24 for object display processing on the server side according to an embodiment of the present disclosure in order to execute object display processing according to an embodiment of the present disclosure. The program 24 is stored in the storage device 15. The CPU 12 also performs overall control of the server 10.

The communication unit 13 controls communication with external devices, such as a client or the like, over the network 1.

The memory 14 is used for example as a work area that is necessary when executing the program 24 for object display processing on the server side.

The storage device 15 stores programs and data necessary for object display processing and is, for example, a mass storage device such as a hard disk drive (HDD), optical disc drive, DVD, or MO. An Operating System (OS) 21, SNS program 22 having a timeline function, SNS game program 23, and program 24 for object display processing on the server side are stored in the storage device 15.

The OS 21 is a program for implementing the basic functions of the server 10.

The SNS program 22 having a timeline function is, for example, an SNS program having a timeline function such as Twitter® or Facebook®.

Figure 4:
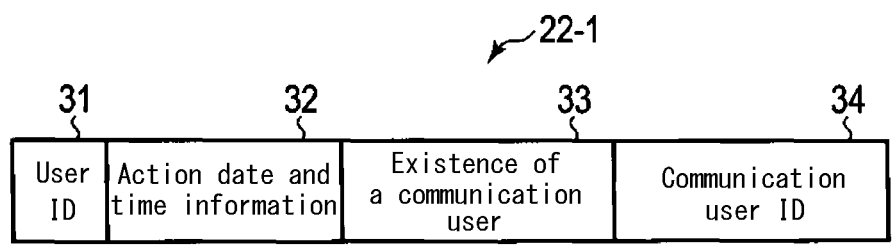
FIG. 4 illustrates a database 22-1 of an SNS program 22.

The SNS program 22 having a timeline function includes a database 22-1. As illustrated in FIG. 4, the database 22-1 stores the following in association with a user ID 31: action date and time information 32, which indicates the date and time a user took an action on the timeline area of the SNS with the mobile phone, a communication user (SNS friend) 33, and a communication user ID 34. When there is a plurality of SNS programs 22 having a timeline function, a database is included for each program.

In this context, a user action refers to taking any sort of user action on the timeline area, including the cases of writing a comment on the timeline area, posting a brief remark, and the like.

The SNS game program 23 provides a social networking game. In the present embodiment, the SNS program 22 having a timeline function, SNS game program 23, and program 24 for object display processing on the server side are provided on the same platform.

The program 24 for object display processing on the server side controls processing on the server side in the method for displaying objects according to the present embodiment.

Figure 5:
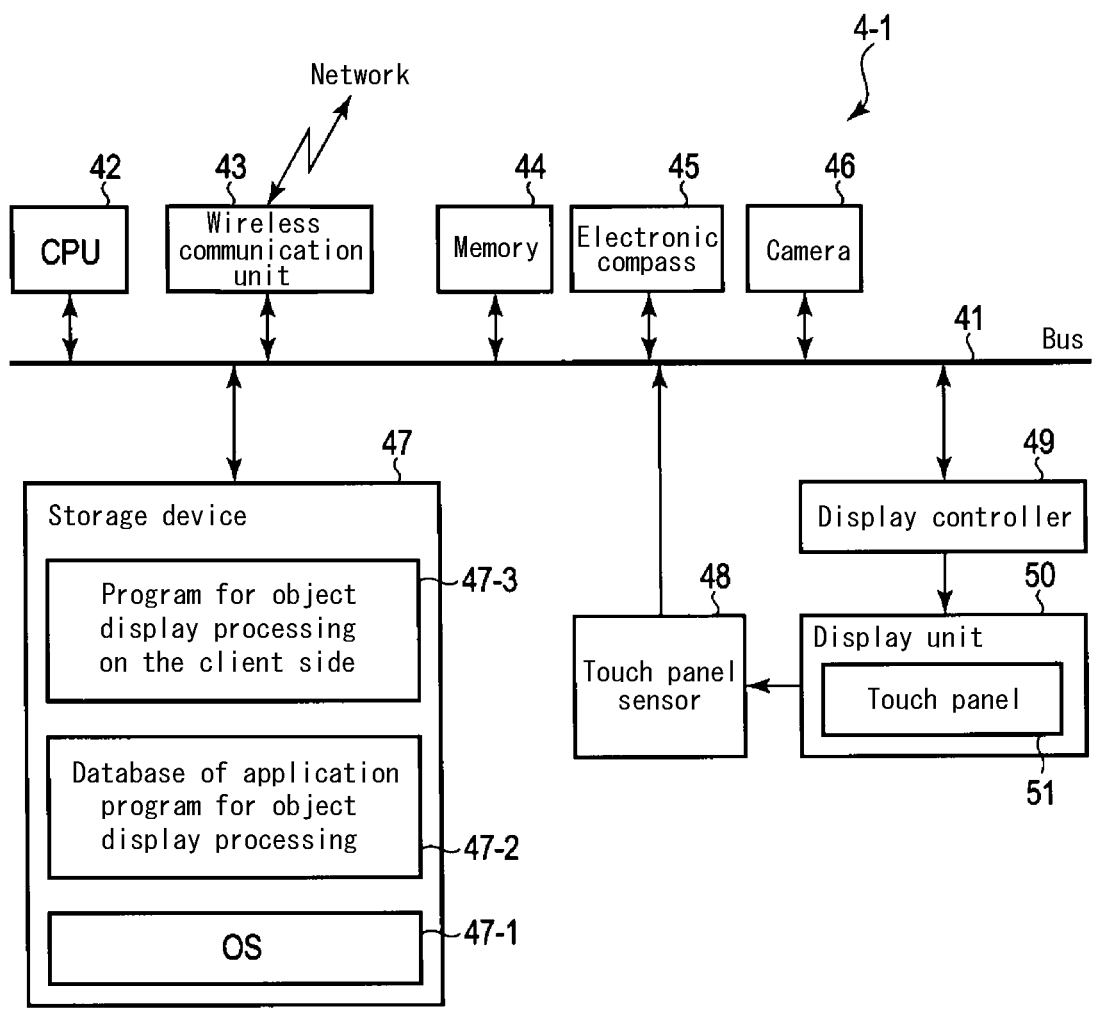
FIG. 5 illustrates the structure of a mobile phone (smart phone) 4-1 according to an embodiment of the present disclosure.

FIG. 5 illustrates the structure of a mobile phone (smart phone) 4-1 according to an embodiment of the present disclosure.

As illustrated in FIG. 5, a CPU 42, wireless communication unit 43, memory 44, electronic compass 45, camera 46, storage device 47, touch panel sensor 48, and display controller 49 are connected to a bus 41.

The CPU 42 coordinates with a program 47-3 for object display processing on the client side according to an embodiment of the present disclosure in order to execute object display processing according to an embodiment of the present disclosure. The program 47-3 is stored in the storage device 47. The CPU 42 also performs overall control of the mobile phone 4-1.

The wireless communication unit 43 controls communication with external devices, such as a server or the like, over the network 1. The wireless communication unit 43 also has a wireless communication function such as wireless LAN, Bluetooth®, WiFi, or the like.

The memory 44 is used for example as a work area that is necessary when executing the program 47-3 for object display processing on the client side.

The electronic compass 45 includes a geomagnetic sensor and measures orientation.

The camera 46 has a photography function and stores captured images in the storage device 47.

The storage device 47 is for storing programs and data necessary for object display processing according to the present embodiment and is, for example, a mass storage device such as a hard disk drive (HDD), optical disc drive, DVD, or MO. An Operating System (OS) 47-1, database 47-2 for the program 47-3 for object display processing on the client side, and the program 47-3 for object display processing on the client side are stored in the storage device 47.

The OS 47-1 is a program for implementing the basic functions of the mobile phone 4-1.

The database 47-2 manages data used in object display processing performed by the program 47-3 for object display processing on the client side.

Figure 6:
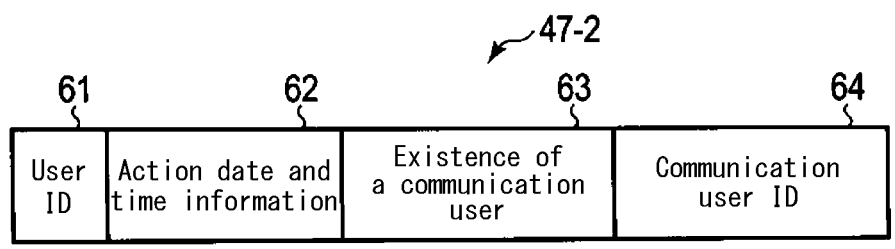
FIG. 6 illustrates a database 47-2 of a program 47-3 for object display processing on the client side.

As illustrated in FIG. 6, the database 47-2 stores a user ID 61 of the mobile phone 4-1, retrieved from the server 10, access date and time information 62, existence of a communication user 63, and a communication user ID 64.

The program 47-3 for object display processing on the client side is a program controlling overall object display processing according to exemplary embodiments of the present disclosure and implements the processing in the below-described flowcharts. The program 47-3 for object display processing on the client side also has a timeline function for displaying, in the timeline area, information transmitted from the SNS program 22 that has a timeline function on the server 10. Among the areas displayed on the display unit of the mobile phone 4-1 (client), the timeline area is an area in which SNS objects (messages, an application advertising frame, a friend recommendation frame, banner ads, and the like) are displayed in order chronologically. In the present embodiment, the timeline area is described as an example of the area in which SNS objects are displayed chronologically, yet the timeline area includes an area in which objects for a Web service are displayed in order chronologically.

The touch panel sensor 48 is a sensor that detects a user action on the touch panel 51 of the display unit 50 in the mobile phone 4-1.

The display controller 49 performs display control for the display unit 50.

Figure 7:
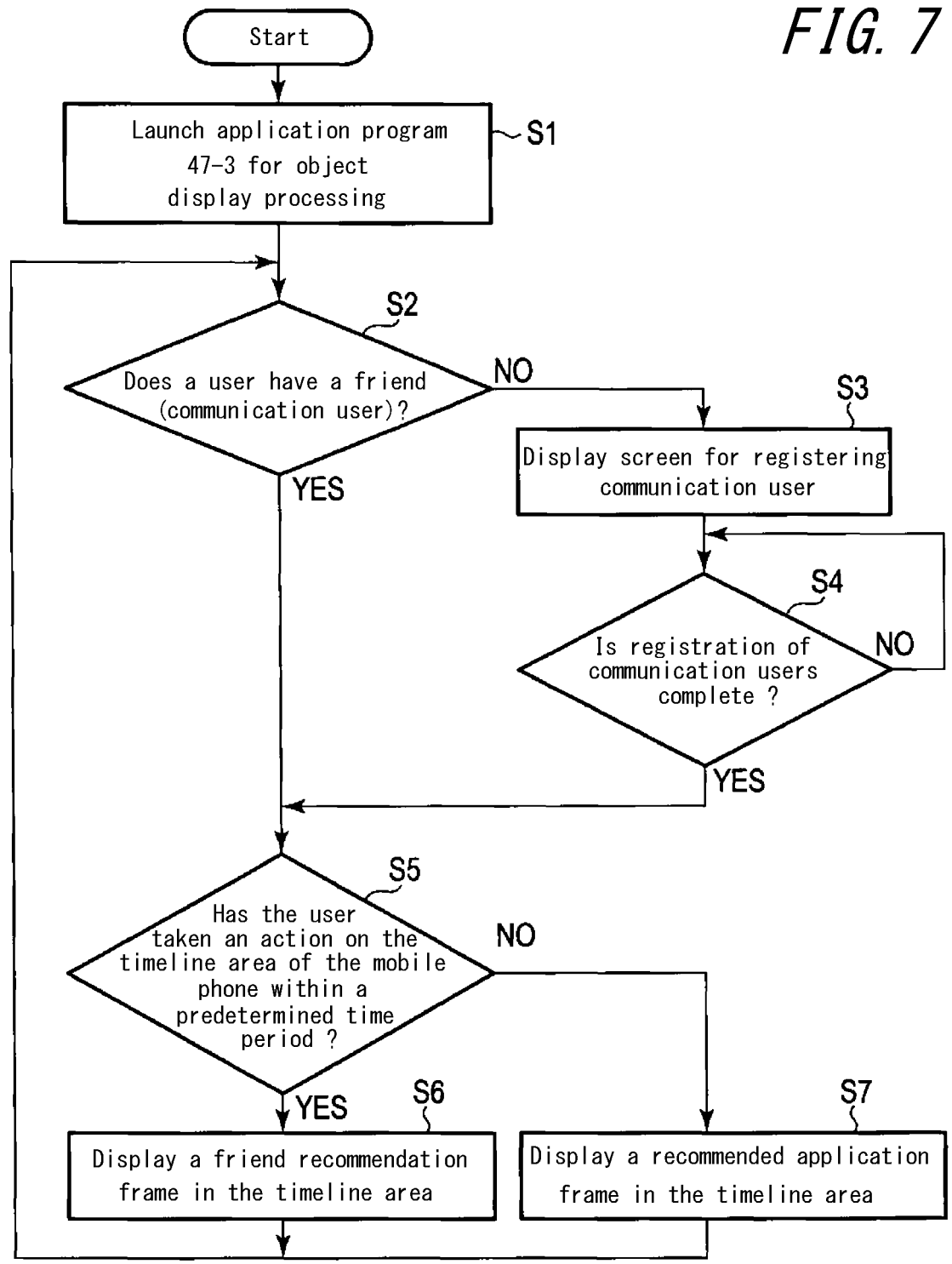
FIG. 7 is a flowchart illustrating the method for displaying objects according to the present embodiment.

Next, the method for displaying objects according to the present embodiment is described with reference to the flowchart in FIG. 7.

First, the user of the mobile phone 4-1 launches the program 47-3 for object display processing on the client side (S1), and it is determined whether the user has any friends (communication users) (S2). The mobile phone 4-1 queries the server 10 as to whether the user has any communication users, the program 24 for object display processing on the server side in the server 10 searches the database 22-1 of the SNS program 22, refers to item 33 on the existence of a communication user for the user ID, and transmits the result to the mobile phone 4-1. The mobile phone 4-1 receives the result regarding the existence of a communication user from the server 10.

In the present embodiment, the case of querying the server 10 has been described, yet the determination may be made by referring to the item 63 on the existence of a communication user for the user ID in the database 47-2 of the application program for object display processing on the mobile phone 4-1.

In S2, when it is determined that the user has no communication users, a screen for registering communication users is displayed (S3). Next, it is determined whether registration of communication users is complete (S4). When it is determined that registration is complete in S4, processing proceeds to S5.

Figure 11:
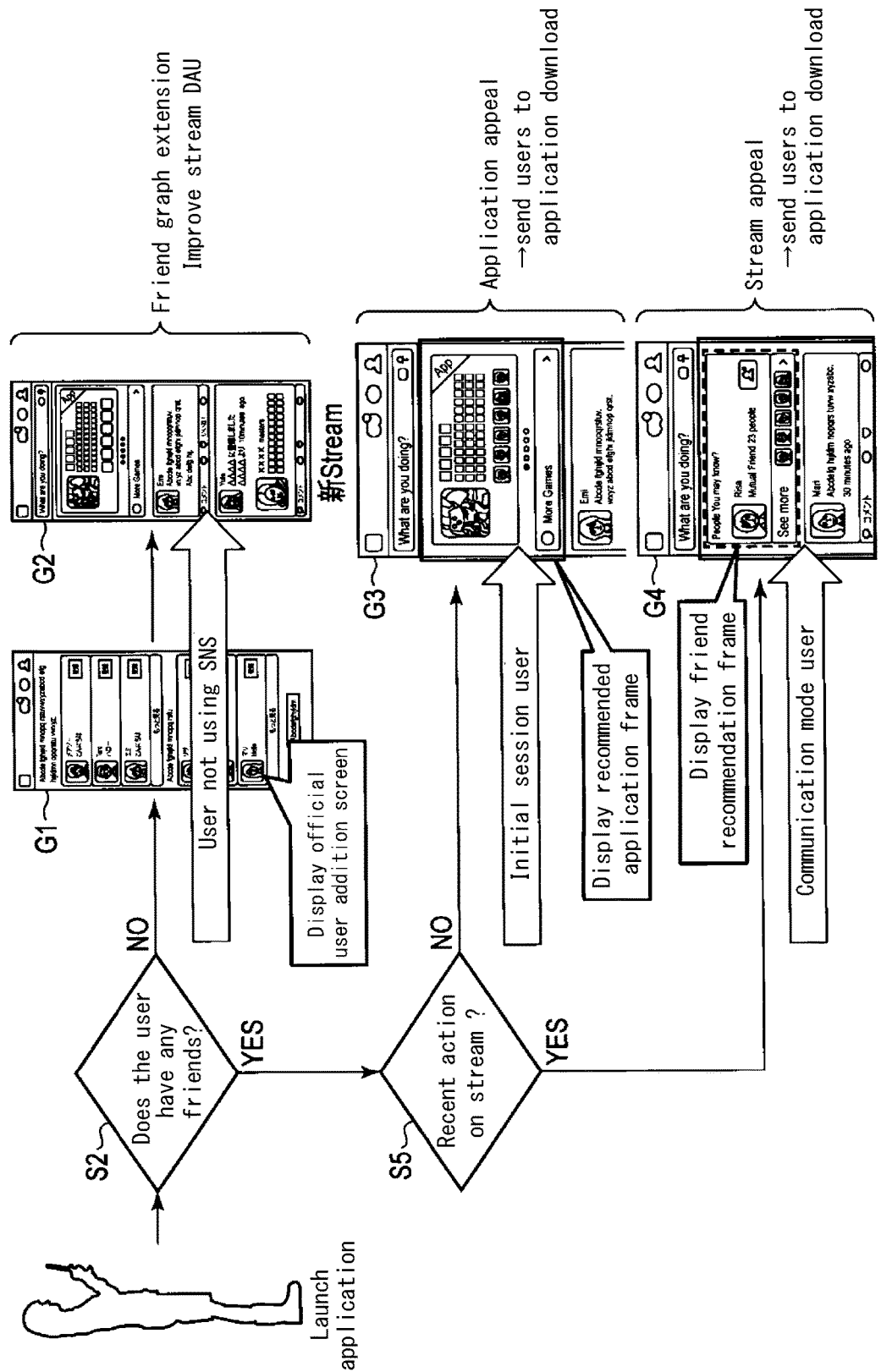
FIG. 11 illustrates an example of a screen on the mobile phone 4-1 in the method for displaying objects according to the present embodiment.

FIG. 11 illustrates an example of a screen on the mobile phone 4-1 in the method for displaying objects according to the present embodiment. In FIG. 11, G1 is an example of a screen for registering communication users, and G2 is an example of an initial screen after registration.

In S5, it is determined whether the user has taken an action on the timeline area of the mobile phone 4-1 within a predetermined time period. In this context, a user action refers to taking any sort of user action on the timeline area, including the cases of writing a comment on the timeline area, posting a brief remark, and the like.

In S5, when it is determined that an action has been taken, the friend recommendation frame is displayed in the timeline area (S6), and processing returns to S2. When it is determined that an action has not been taken, a recommended application frame is displayed in the timeline area (S7), and processing returns to S2.

In accordance with the determination result, the friend recommendation frame or the recommended application frame may be retrieved from the server 10 each time, or a frame that was transmitted from the server 10 in the past and stored on the mobile phone 4-1 may be used.

G3 in FIG. 11 is an example of a screen displaying the recommended application frame in the timeline area, and G4 is an example of a screen displaying the friend recommendation frame in the timeline area. As shown in the screen G3, friends who are playing using the application program are displayed in the recommended application frame.

Figure 8:
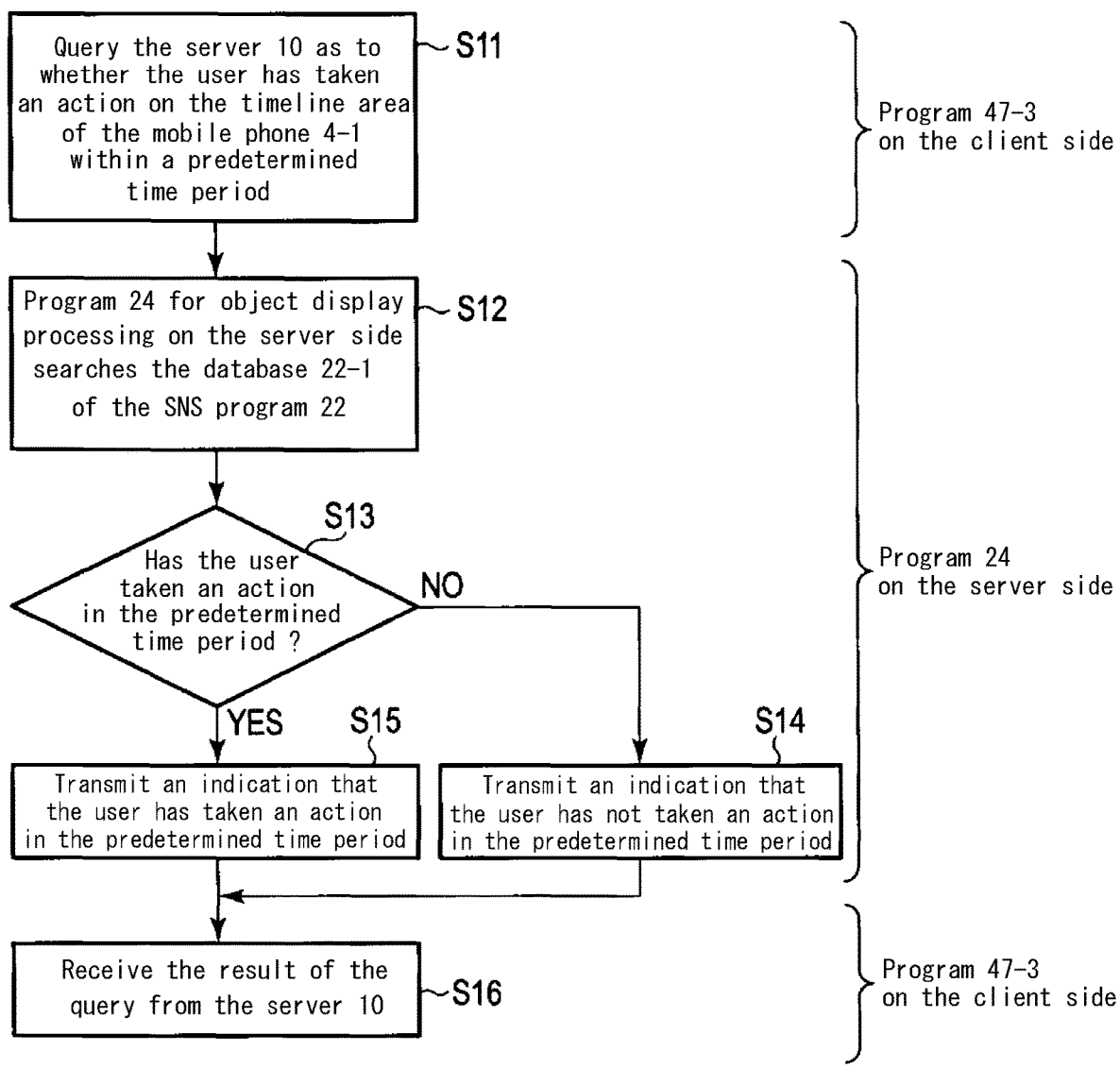
FIG. 8 is a flowchart illustrating an example of the determination, in S5 of the method for displaying objects according to the present embodiment, of whether the user has taken an action on the timeline area within a predetermined time period.

FIG. 8 is a flowchart illustrating an example of the determination in S5 of whether the user has taken an action on the timeline area within a predetermined time period.

As illustrated in FIG. 8, the program 47-3 for object display processing on the client side queries the server 10 as to whether the user has taken an action on the timeline area of the mobile phone 4-1 within a predetermined time period (S11).

The program 24 for object display processing on the server side searches the database 22-1 of the SNS program 22 (S12) and determines whether the user has taken an action within the predetermined time period (S13). Specifically, the program 24 for object display processing on the server side refers to the action date and time information 32 corresponding to the user ID 31 of the user that made the query, and based on whether a predetermined time period has elapsed since the last action date and time information, determines whether the user has taken an action within the predetermined time period.

In S13, when it is determined that the user has not taken an action in the predetermined time period, an indication that the user has not taken an action in the predetermined time period is transmitted to the mobile phone 4-1 (S14). When it is determined that the user has taken an action in the predetermined time period, an indication that the user has taken an action in the predetermined time period is transmitted to the mobile phone 4-1 (S15).

Subsequently, the program 47-3 for object display processing on the client side receives the result of the query from the server 10 (S16). In this way, the mobile phone 4-1 can determine whether an action has been taken within the predetermined time period.

In the example in FIG. 8, the case of the server 10 determining whether an action has been taken within the predetermined time period has been described, yet this determination may be made on the client side.

Figure 9:
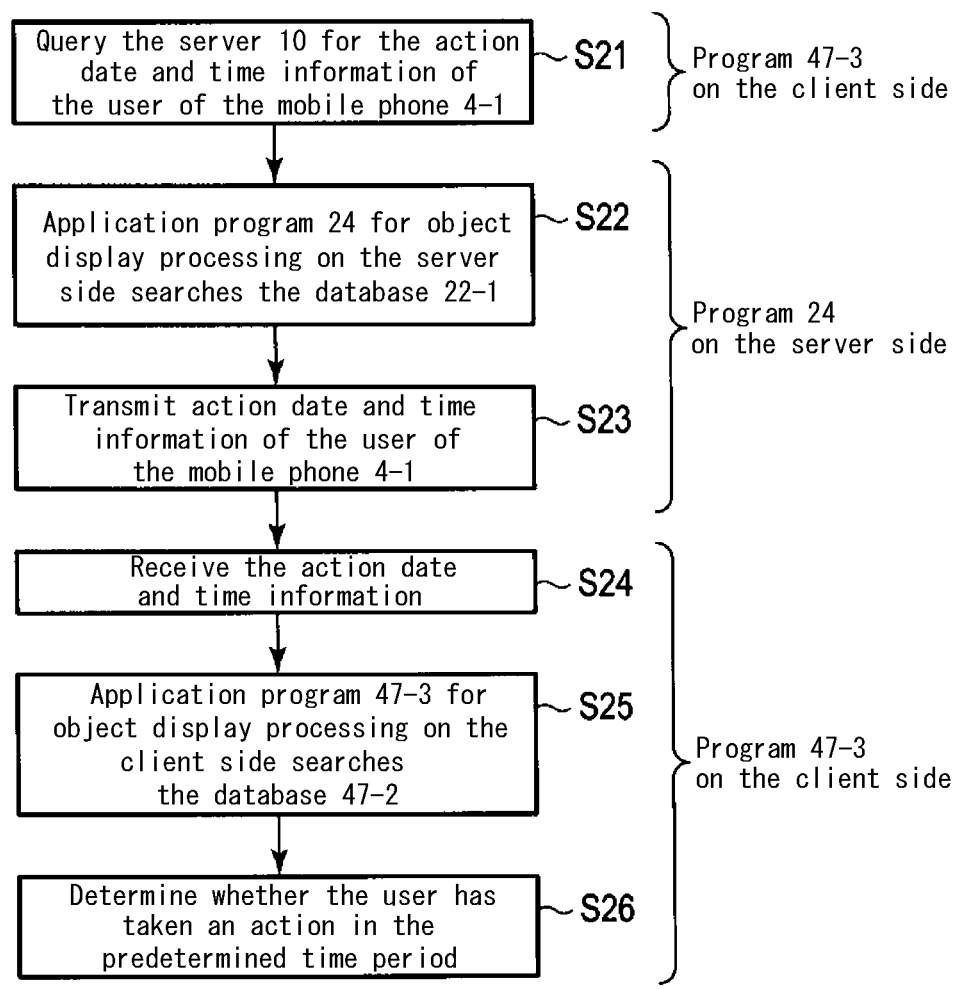
FIG. 9 is a flowchart illustrating the processing in S5 on the client side in the method for displaying objects according to the present embodiment.

FIG. 9 is a flowchart illustrating processing in S5 on the client side.

As illustrated in FIG. 9, the program 47-3 for object display processing on the client side queries the server 10 for the action date and time information of the mobile phone 4-1 (S21). Upon receiving the query for the action date and time information, the program 24 for object display processing on the server side searches the database 22-1 (S22) and transmits information (user ID 31, existence of a communication user 33, and communication user ID 34) including the newest action date and time information 32 corresponding to the user ID 61 of the user that made the query (S23).

Subsequently, the program 47-3 for object display processing on the client side receives the action date and time information (S24), searches the database 47-2 (S25), and determines whether the user has taken an action in the predetermined time period (S26).

Specifically, based on the date and time indicated by the received newest action date and time information 32, it is determined whether the predetermined time period has elapsed from the data and time indicated by the newest action date and time information 62 of the mobile phone 4-1.

Figure 10:
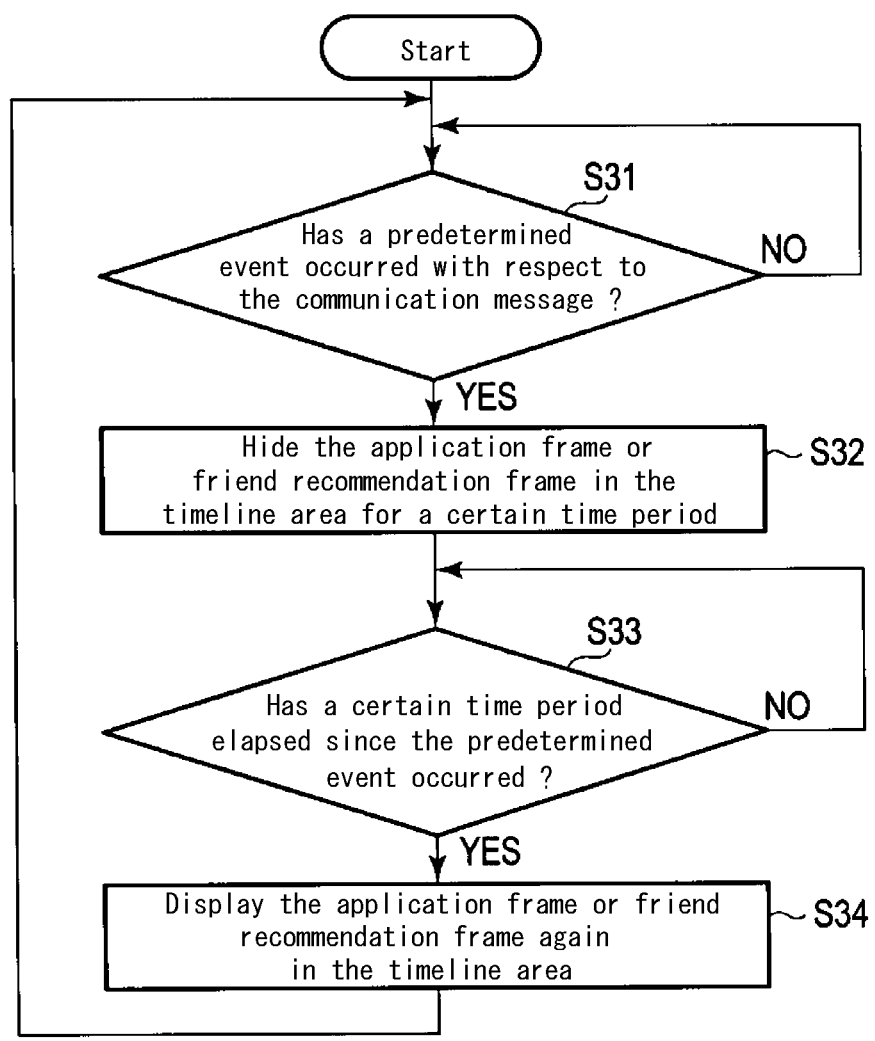
FIG. 10 is a flowchart illustrating the processing when an action, such as writing in response to a user's comment in the timeline area, is taken while an application announcement frame is displayed in the timeline area.

With reference to the flowchart in FIG. 10, the following describes the processing when an action, such as writing in response to a user's comment in the timeline area, is taken while an application announcement frame is displayed in the timeline area, as illustrated in FIG. 12.

It is determined whether a predetermined event has occurred with respect to the communication message displayed in the timeline area (S31). In this context, a predetermined event refers to writing a comment in response to another user's communication message, writing one's own message, or the like.

When a predetermined event is determined to have occurred, the application frame or friend recommendation frame in the timeline area is hidden for a certain time period (S32). FIG. 12 illustrates examples of a screen when the application announcement frame is displayed and a screen when the application announcement frame is hidden due to writing of a comment.

Next, it is determined whether a certain time period has elapsed since the predetermined event occurred (S33). When it is determined that a certain time period has elapsed since the predetermined event occurred, the application announcement frame or the friend recommendation frame is displayed again in the timeline area (S34), and processing returns to S31.

Note that since the application frame or the friend recommendation frame are also displayed in the timeline area, the application announcement frame also flows downwards as part of the stream in cases such as when someone else posts a comment, as illustrated in FIG. 13. This differs from a conventional technique.

In the present embodiment, the case of displaying the application frame or the friend recommendation frame in the timeline area has been described, yet the present disclosure is not limited in this way. For example, as illustrated in FIG. 14, targeted ads may be displayed based on a user's attributes.

Accordingly, the present embodiment allows for display of different objects in the timeline area in accordance with whether the user has taken an action on the timeline area within a predetermined time period. As a result, it is possible to provide a method for displaying objects on a timeline area that does not lower user retention and that can increase the CVR.

Several embodiments of the present disclosure have been described, yet these embodiments are merely examples and are not meant to limit the scope of the present disclosure. New embodiments may be implemented in a variety of other ways, and a variety of omissions, substitutions, and modifications may be made without departing from the scope of the present disclosure. Such embodiments and modifications are both included in the scope of the present disclosure and included in the disclosure, and its equivalents, as recited in the patent claims. For example, the case of a timeline function in an SNS has been described, yet the present disclosure may be applied to chronological communication messages on a Web service other than an SNS.

The means described in the embodiments may be a program capable of being executed by a calculating machine (computer). The program may, for example, be stored on a recording medium such as a magnetic disk (Floppy® disk, hard disk, or the like), optical disc (CD-ROM, DVD, MO, or the like), or semiconductor memory (ROM, RAM, flash memory, or the like), or may be transmitted for distribution over a communication medium. A program stored on a medium includes the case of a setup program that configures, on a calculating machine, software means (including not only executable programs, but also tables and data structures) to be executed on the calculating machine. The calculating machine for implementing the present device executes the above-described processing by reading a program recorded on a recording medium, or in some cases by constructing software means via a setup program and having operations be controlled by the software means. The recording medium referred to in the present disclosure is not limited to a recording medium for distribution but also includes recording media such as magnetic disks, semiconductor memory, and the like provided either within a calculating machine or in a device connected over a network.

The invention claimed is:

1. A method for displaying an object, comprising:
    managing actions of a user in a web service;
    determining whether the user has taken a subsequent action in a display area of the web service within a predetermined time period; and
    in response to determining that the user has not taken the subsequent action within the predetermined time period, displaying a first object in the display area, wherein
    the predetermined time period is measured as an amount of time that has elapsed since a particular event occurred,
    the particular event is a previous action taken by the user in the display area of the web service,
    the subsequent action includes writing a comment on the display area or posting a remark on the display area, the display area of the web service is a chronological display area in which objects and comments and remarks are displayed in order chronologically, and in response to the user not writing the comment or posting the remark on the chronological display area within the predetermined time period since the previous action taken by the user in the chronological display area, the first object is displayed in the chronological display area.

2. The method according to claim 1, wherein the first object is a recommended application frame.

3. The method according to claim 1, wherein the first object is an advertisement.

4. The method according to claim 1, further comprising in response to determining that the user has taken the subsequent action within the predetermined time period, displaying a second object in the display area that is different from the first object.

5. The method according to claim 4, wherein the first object includes a first recommendation, and the second object includes a second recommendation.

6. The method according to claim 5, wherein the first object is a recommended application frame having the first recommendation, and the second object is friend recommendation frame having the second recommendation.

7. A non-transitory computer-readable medium storing thereon a program which, when executed by circuitry, causes the circuitry to:

manage actions of a user in a web service;

determine whether the user has taken a subsequent action in a display area of the web service within a predetermined time period; and in response to determining that the user has not taken the subsequent action within the predetermined time period, display a first object in the display area, wherein the predetermined time period is measured as an amount of time that has elapsed since a particular event occurred, the particular event is a previous action taken by the user in the display area of the web service, the subsequent action includes writing a comment on the display area or posting a remark on the display area, the display area of the web service is a chronological display area in which objects and comments and remarks are displayed in order chronologically, and in response to the user not writing the comment or posting the remark on the chronological display area within the predetermined time period since the previous action taken by the user in the chronological display area, the first object is displayed in the chronological display area.

8. The non-transitory computer-readable medium according to claim 7, wherein the first object is a recommended application frame.

9. The non-transitory computer-readable medium according to claim 7, wherein the first object is an advertisement.

10. The non-transitory computer-readable medium according to claim 7, wherein the program further causes the circuitry to:

in response to determining that the user has taken the subsequent action within the predetermined time period, display a second object in the display area that is different from the first object.

11. The non-transitory computer-readable medium according to claim 10, wherein the first object includes a first recommendation, and the second object includes a second recommendation.

12. The non-transitory computer-readable medium according to claim 11, wherein the first object is a recommended application frame having the first recommendation, and the second object is friend recommendation frame having the second recommendation.

13. A device comprising:

circuitry configured to:

manage actions of a user in a web service;

determine whether the user has taken a subsequent action in a display area of the web service within a predetermined time period; and in response to determining that the user has not taken the subsequent action within the predetermined time period, display a first object in the display area, wherein the predetermined time period is measured as an amount of time that has elapsed since a particular event occurred, the particular event is a previous action taken by the user in the display area of the web service, the subsequent action includes writing a comment on the display area or posting a remark on the display area, the display area of the web service is a chronological display area in which objects and comments and remarks are displayed in order chronologically, and in response to the user not writing the comment or posting the remark on the chronological display area within the predetermined time period since the previous action taken by the user in the chronological display area, the first object is displayed in the chronological display area.

* * * * *